(12) United States Patent
Zhang (10) Patent No.: US 10,826,726 B2
(45) Date of Patent: Nov. 3, 2020

(54) MULTI-RADIO DEVICE AND METHOD OF OPERATION THEREOF

(71) Applicant: Marvell World Trade Ltd., St. Michael (BB)

(72) Inventor: Hongyuan Zhang, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/545,486

(22) Filed: Aug. 20, 2019

(65) Prior Publication Data
US 2020/0067737 A1 Feb. 27, 2020

Related U.S. Application Data

(60) Provisional application No. 62/721,425, filed on Aug. 22, 2018.

(51) Int. Cl.
| | |
|---|---|
| *H04L 25/02* | (2006.01) |
| *H04L 1/00* | (2006.01) |
| *H04L 25/03* | (2006.01) |

(52) U.S. Cl.
CPC ........ *H04L 25/0204* (2013.01); *H04L 1/0063* (2013.01); *H04L 25/0256* (2013.01); *H04L 25/03286* (2013.01)

(58) Field of Classification Search
CPC ... H04B 1/38; H04B 1/44; H04B 7/02; H04B 7/04; H04B 7/06; H04B 7/08; H04B 7/12; H04B 7/216; H04B 7/0413; H04J 1/00; H04J 3/16; H04L 1/00; H04L 1/0063; H04L 5/14; H04L 25/02; H04L 25/03; H04L 25/0204; H04L 25/0256; H04L 25/03286; H04L 27/00

USPC ........ 327/117, 118, 158; 370/277, 342, 343, 370/470; 375/219, 222, 257, 260, 262, 375/267, 295, 316; 455/75, 83, 132, 144, 455/168.1, 501

See application file for complete search history.

(56) References Cited

U.S. PATENT DOCUMENTS

| | | | | |
|---|---|---|---|---|
| 7,398,068 B2 * | 7/2008 | Javor | ................ | H04B 1/30 455/140 |
| 9,584,201 B2 | 2/2017 | Shapira et al. | | |
| 2005/0227631 A1 * | 10/2005 | Robinett | ............ | H04B 7/0868 455/83 |
| 2010/0091688 A1 * | 4/2010 | Staszewski | ........... | H04L 5/06 370/277 |

(Continued)

*Primary Examiner* — Shawkat M Ali (57) ABSTRACT

A wireless device includes first and second analog radio modules, first and second medium access control modules configured to control access to a digital network via the first and second analog radio modules, respectively, first and second baseband modules configured to convert between analog signals at the first and second analog radio modules, respectively, and digital signals at the first and second medium access control module, respectively, and circuitry configured to selectably coordinate the first and second medium access control modules to create a single-channel configuration for use by the wireless device to transmit and receive radio signals over a wireless interface, by setting the first and second analog radio modules to operate on a common frequency, and by commonly controlling the first and second baseband modules to convert common packets between analog and digital signals transmitted to or received from respective medium access control modules.

21 Claims, 6 Drawing Sheets

(56) References Cited

U.S. PATENT DOCUMENTS

2014/0269865 A1* 9/2014 Aparin .................... H04L 27/38
375/222
2014/0362936 A1* 12/2014 Tang ................. H04W 56/0015
375/267

* cited by examiner

MULTI-RADIO DEVICE AND METHOD OF OPERATION THEREOF

CROSS REFERENCE TO RELATED APPLICATION

This disclosure claims the benefit of commonly-assigned U.S. Provisional Patent Application No. 62/721,425, filed Aug. 22, 2018, which is hereby incorporated by reference herein in its entirety.

FIELD OF USE

This disclosure relates to a multi-radio device in a wireless transmission system. More particularly, this disclosure relates to a dual-radio device that can be selectably operated as two separate channels, or as a single enhanced channel.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In wireless systems (e.g., in "Wireless Fidelity," or "WiFi" systems under the various forms of the IEEE 802.11 standard), it is known to have two types of radios that may be used together. For example, in an 80+80 MHz mode in the 5 GHz band under IEEE 802.11ac and IEEE 802.11ax, two channels of 80 MHz width, which may be contiguous or non-contiguous, can be operated together as a single channel of 160 MHz width. Similarly, there are systems that have both 2.4 GHz radios and 5 GHz radios, both of which can operate in a "dual-band concurrent (DBC)" mode to support two different channels simultaneously, one on each band. However, in both of those examples, any one channel is operating independently of any other channel according to a fixed standard.

SUMMARY

A wireless device in accordance with a first implementation of the subject matter of this disclosure includes a first analog radio module, a first medium access control module configured to control access to a digital network via the first analog radio module, a first baseband module configured to convert between analog signals at the first analog radio module and digital signals at the first medium access control module, a second analog radio module, a second medium access control module configured to control access to a digital network via the second analog radio module, a second baseband module configured to convert between analog signals at the second analog radio module and digital signals at the second medium access control module, and circuitry configured to selectably coordinate the first and second medium access control modules to create a single-channel configuration for use by the wireless device to transmit and receive radio signals over a wireless interface, by setting the first analog radio module and the second analog radio module to operate on a common frequency, and by commonly controlling the first and second baseband modules to convert common packets between analog and digital signals transmitted to or received from respective medium access control modules.

In a first variant of the wireless device according to the first implementation, the circuitry configured to selectably coordinate the first and second medium access control modules may be further configured to selectably operate the first and second medium access control modules, the first and second analog radio modules and the first and second baseband modules in a dual-band concurrent mode.

The wireless device according to the first implementation may further include a first local oscillator configured to provide a frequency source for the first analog radio module, and a second local oscillator configured to provide a frequency source for the second analog radio module wherein the circuitry configured to selectably coordinate may be configured to set the first and second analog radio modules to operate on the common frequency by setting the first and second local oscillators to the common frequency.

The wireless device according to the first implementation may further include a first local oscillator configured to provide a frequency source for the first analog radio module, and a second local oscillator configured to provide a frequency source for the second analog radio module, wherein the circuitry configured to selectably coordinate may configured to set the first and second analog radio modules to operate on a common frequency by connecting the first and second analog radio modules to a common one of the first and second local oscillators.

In a second variant of the wireless device according to the first implementation, the circuitry configured to selectably coordinate may be configured to configure the first and second medium access control modules for common control of the first and second baseband modules by interconnecting the first and second medium access control modules as a single combined media access control module that transmits identical packets to, and receives identical packets from, both the first and second baseband modules.

In a third variant of the wireless device according to the first implementation, the circuitry for selectively coordinating may be configured to configure the first and second medium access control modules for common control of the first and second baseband modules by disconnecting one of the first and second baseband modules from its respective one of the first and second medium access control modules, and connecting the one of the first and second baseband modules to another of the first and second medium access control modules.

In a fourth variant of the wireless device according to the first implementation, the first baseband module may be configured to decode incoming data, and to provide first decoded incoming data with a first error indicator, the second baseband module may be configured to decode the incoming data that is decoded by the first baseband module, and to provide second decoded incoming data with a second error indicator, and the coordinated first and second medium access control modules may include circuitry configured to compare the first error indicator and the second error indicator, and to accept one of the first decoded incoming data and the second decoded incoming data from one of the first baseband module and the second base band module when at least one of the first error indicator and the second error indicator indicates an absence of error.

In that fourth variant of the wireless device according to the first implementation, each respective one of the first error indicator and the second error indicator may be a respective checksum.

In a fifth variant of the wireless device according to the first implementation, each respective one of the first and second baseband modules may have a predetermined number of antennas and may be configured to process a quantity of spatial streams equal to the predetermined number, and the circuitry configured to selectably coordinate may coordinate the first and second baseband modules to operate as a merged baseband module having a merged number of antennas equal to twice the predetermined number.

In that fifth variant of the wireless device according to the first implementation, the merged baseband module may be configured to process a merged number of spatial streams equal to twice the predetermined number.

In that fifth variant of the wireless device according to the first implementation, the merged baseband module may be configured to process each of the spatial streams on more than one of the antennas to provide redundant data paths for each of the spatial streams.

A method of operating a wireless device having a first analog radio module, a first medium access control module configured to control access to a digital network via the first analog radio module, a first baseband module configured to convert between analog signals at the first analog radio module and digital signals at the first medium access control module, a second analog radio module, a second medium access control module configured to control access to a digital network via the second analog radio module, a second baseband module configured to convert between analog signals at the second analog radio module and digital signals at the second medium access control module, in accordance with a second implementation of the subject matter of this disclosure, includes selectably coordinating the first and second medium access control modules to create a single-channel configuration for use by the wireless device to transmit and receive radio signals over a wireless interface, by setting the first analog radio module and the second analog radio module to operate on a common frequency, and by commonly controlling the first and second baseband modules to convert common packets between analog and digital signals transmitted to or received from respective medium access control modules.

A first variant of the method according to the second implementation further comprises selectably operating the first and second medium access control modules, the first and second analog radio modules and the first and second baseband modules in a dual-band concurrent mode In a second variant of the method according to the second implementation, the selectably coordinating may include setting a first local oscillator, configured to provide a frequency source for the first analog radio module, and a second local oscillator, configured to provide a frequency source for the second analog radio module, to the common frequency.

In a third variant of the method according to the second implementation, when a first local oscillator provides a frequency source for the first analog radio module and a second local oscillator provides a frequency source for the second analog radio module, the selectably coordinating may include setting the first and second analog radio modules to operate on a common frequency by connecting the first and second analog radio modules to a common one of the first and second local oscillators.

In a fourth variant of the method according to the second implementation, the selectably coordinating the first and second medium access control modules for common control of the first and second baseband modules may include interconnecting the first and second medium access control modules as a single combined medium access control module that transmits identical packets to, and receives identical packets from, both the first and second baseband modules.

In a fifth variant of the method according to the second implementation, the selectably coordinating the first and second medium access control modules for common control of the first and second baseband modules may include disconnecting one of the first and second baseband modules from its respective one of the first and second medium access control modules, and connecting the one of the first and second baseband modules to another of the first and second medium access control modules.

In a sixth variant of the method according to the second implementation, the coordinating the first and second medium access control modules to create the single-channel configuration by commonly controlling the first and second baseband modules may include configuring the first baseband module to decode incoming data and provide first decoded incoming data with a first error indicator, configuring the second baseband module to decode the incoming data that is decoded by the first baseband module and provide second decoded incoming data with a second error indicator, and configuring the first and second medium access control modules to compare the first error indicator and the second error indicator, and to accept one of the first decoded incoming data and the second decoded incoming data from one of the first baseband module and the second baseband module when at least one of the first error indicator and the second error indicator indicates an absence of error.

In that sixth variant, configuring the first baseband module to provide a first error indicator may include configuring the first baseband module to provide a first checksum, and configuring the second baseband module to provide a second error indicator may include configuring the second baseband module to provide a second checksum.

In a seventh variant of the method according to the second implementation, when each of the first and second medium access control modules has a predetermined number of antennas and is configured to process a quantity of spatial streams equal to the predetermined number, the selectably coordinating the first and second medium access control modules to create the single-channel configuration by commonly controlling the first and second baseband modules may include controlling the first and second baseband modules to process a merged number of spatial streams equal to twice the predetermined number.

In an eighth variant of the method according to the second implementation, when each of the first and second medium access control modules is configured to process a predetermined number of spatial streams, the selectably coordinating the first and second medium access control modules to create the single-channel configuration by commonly controlling the first and second baseband modules may include controlling the first and second baseband modules to process each of the spatial streams on more than one of the antennas to provide redundant data paths for each of the spatial streams.

BRIEF DESCRIPTION OF THE DRAWINGS

Further features of the subject matter of this disclosure, its nature and various advantages, will be apparent upon consideration of the following detailed description, taken in conjunction with the accompanying drawings, in which like reference characters refer to like parts throughout, and in which.

DETAILED DESCRIPTION

In accordance with implementations of the present disclosure, a flexible, reconfigurable radio architecture is provided. A wireless device having two analog radio modules may be configured to operate in dual-band concurrent mode as described above, in which each analog radio module supports one or more channels in each of two different frequency bands connected to two different networks (e.g., as one WiFi network in the 2.4 GHz band and one WiFi network in the 5 GHz band, as referred to above, or as two separate WiFi networks in the 5 GHz band). Alternatively, however, both analog radio modules may be operated in the same frequency band on the same network. As discussed below, this can be used to provide improved signal diversity.

Structures according to implementations of the present disclosure include two medium access controllers (MACs) in the data link layer, as well as two analog radio modules and two baseband modules that together make up the physical layer. These components can be configured flexibly according to the needs of a user or system operator, either at the time of deployment or reconfigurably in the field.

One configuration is a standard configuration that groups the analog radio modules, the baseband modules and the MAC modules into separate instances, each including one analog radio module, one baseband module and one MAC module. The separate instances may operate as two separate WiFi entities in a dual-band concurrent mode, or as complementary channels in an 80+80 mode.

In a second configuration, the two analog radio modules are tuned to the same frequency, while the two baseband modules continue to operate independently on the same channel. For example, each may operate as a 2×2 MIMO (multiple-input/multiple-output) channel with two antennas and two spatial streams. However, one MAC controls both baseband modules, and both channels operate on the same data. In a first variant, the one MAC could be a single MAC (with the second MAC unused), or in a second variant the one MAC could be a combined MAC. Regardless of which variant of the second configuration is implemented, operation according to the first configuration or the second configuration is selectable.

As an example of such a configuration, on the receive side, with both radio/baseband pairs receiving the same signal, the received signal on each channel could be processed, and then the outputs of the two channels can be compared. As one form of comparison, a respective separate checksum operation can be performed on the respective received signal in each channel, and the signal can be passed on from the MAC to the functional circuitry of the device as long as the two checksum results show that at least one of the two baseband modules has successfully decoded the signal. Thus, interference on only one stream does not result in a request for retransmission when the baseband module processing the other stream successfully decodes the received signal; retransmission is needed only if both baseband modules fail their respective checksum operations. Reception diversity, and therefore reliability, are thereby increased.

Such an example can be implemented where either the one MAC controlling the baseband modules in the two separate channels is a single MAC or the one MAC is a combined MAC. In the case of a single MAC, the single MAC would have to be provided with comparison circuitry for use when controlling two channels (which would be unused when the MAC is controlling only one channel), while in the case of a combined MAC, the circuitry provided to coordinate the two MACS could include the comparison circuitry.

In a third configuration, the two analog radio modules are tuned to the same frequency, while the two baseband modules operate in a merged mode, as a single merged baseband module. For example, two 2×2 MIMO baseband modules may operate together as one 4×4 MIMO module. One MAC, as in the second variant of the previous configuration, controls both baseband modules. The one MAC again could be a single MAC or a combined MAC, as above. With one channel operating on twice as many antennas, reception diversity and transmission diversity, and therefore reliability, as well as transmission power, are thereby increased. In addition, because the combined baseband module includes four spatial streams instead of two spatial streams, throughput may be increased.

Specifically, there are two options for the third configuration. According to one option, the merged baseband module supports the original number of spatial streams of each individual baseband module (i.e., two spatial streams), with the same throughput, but using twice as many data paths (i.e., antennas) to increase diversity/reliability and transmit power. According to another option, however, throughput is increased by operating the four spatial streams as four separate streams. Although the latter option does not increase transmit power, signal diversity/reliability on the channel is still improved.

These configurations may be better understood by reference to FIGS. 1-5.

Figure 1:
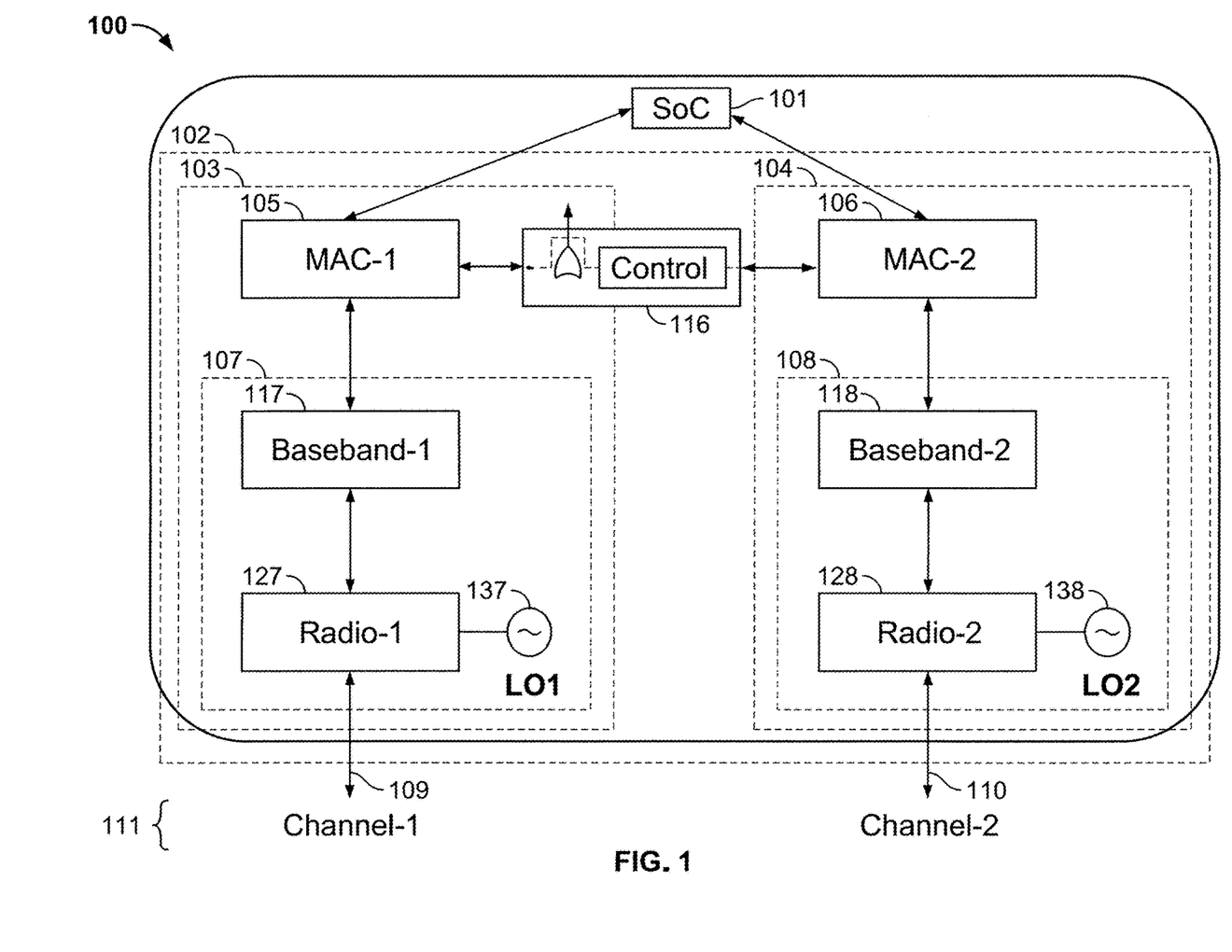
FIG. 1 is a representation of a device according to implementations of the subject matter of this disclosure, in a first configuration.

FIG. 1 shows a first configuration of a device 100 according to implementations of the subject matter of this disclosure. Device 100, which may be a system-on-chip (SoC) having functional circuitry 101, includes transceiver circuitry 102 having at least two channels 103, 104. Each channel 103, 104 includes a MAC 105, 106 disposed between functional circuitry 101 and physical layer circuitry 107, 108. Physical layer circuitry 107, 108 includes respective baseband modules 117, 118, and respective analog radio modules 127, 128, which connect to respective channels 109, 110 of air interface 111 (for instance, a WiFi interface in the example). Each analog radio module 127, 128 has a respective local oscillator 137, 138 (LO1, LO2) that is configurable to determine a respective frequency of operation for each respective radio module 127, 128. Coordination circuitry 116, coupled to the MACs 105, 106 and discussed below, is unused in this configuration.

As noted above, the first configuration of device 100 operates conventionally. Each local oscillator 137, 138, and therefore each analog radio module 127, 128 may be tuned to its own respective frequency. The respective frequencies may be in different bands (e.g., 2.4 GHz and 5 GHz frequency bands, respectively) in a standard dual-band concurrent operation mode.

Figure 2:
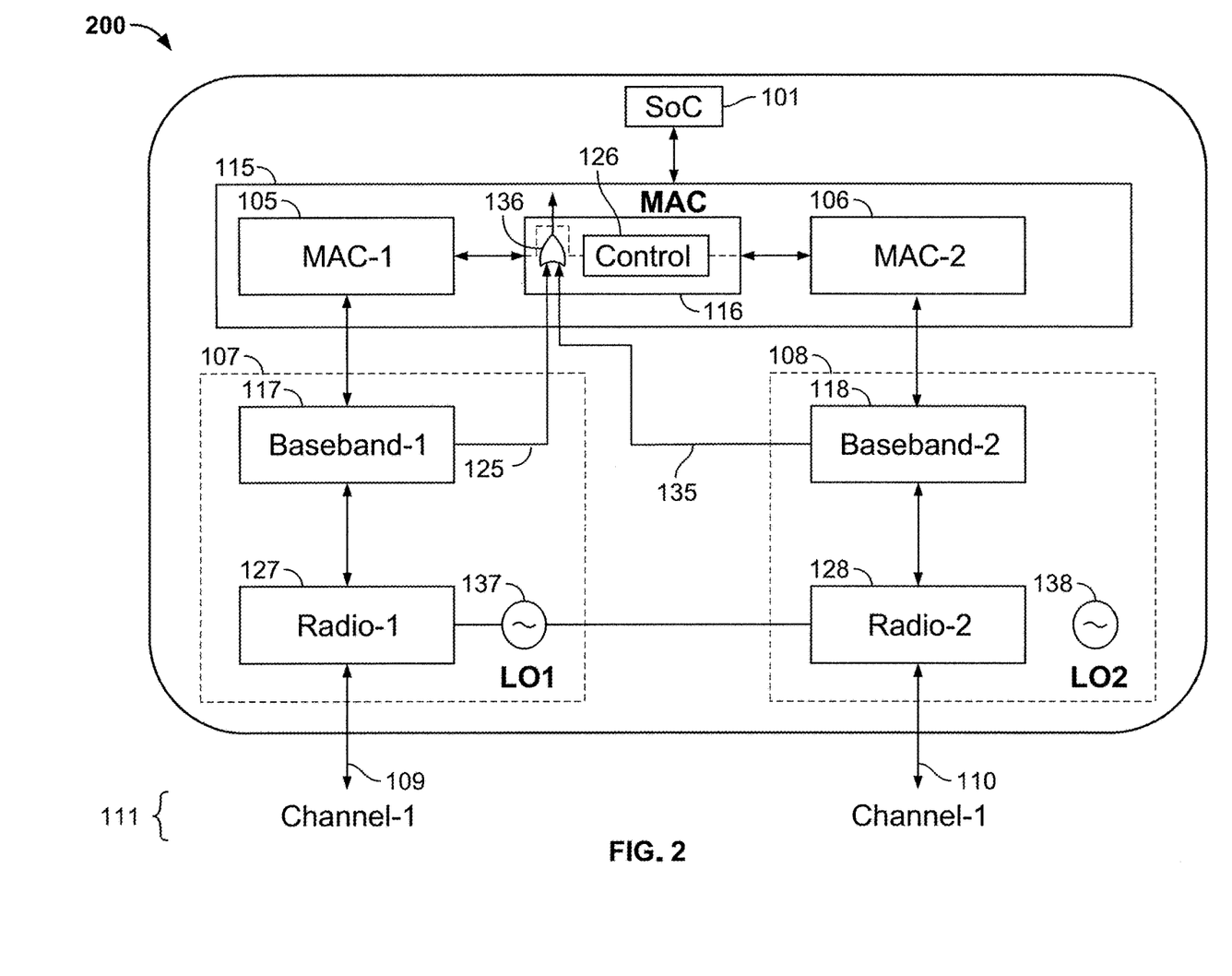
FIG. 2 is a representation of the device of FIG. 1 in a second configuration according to implementations of the subject matter of this disclosure.

A second configuration 200 of device 100 is shown in FIG. 2. In configuration 200, both analog radio modules 127, 128 derive their frequencies from the same local oscillator 137, and oscillator 138 is disconnected. Alternatively (not shown), both local oscillators 137, 138 are tuned to the same frequency. A single MAC controls both baseband modules 117, 118. According to one variant (not shown), the single MAC is one of the two MACs 105, 106. According to the variant illustrated, the single MAC 115 is a combination of the two MACs 105, 106, linked by coordination circuitry 116.

Coordination circuitry 116 includes control circuitry 126 that allows MACs 105, 106, each of which communicates with a respective one of baseband modules 117, 118, to coordinate commands to baseband modules 117, 118. In addition, in the variant illustrated, coordination circuitry 116 includes comparison circuitry 136 (in the illustration, the comparison circuitry is an OR-gate) which compares checksum outputs 125, 135 of baseband modules 117, 118 to determine whether a received packet has been decoded correctly by either one of baseband modules 117, 118. If either (or both) of checksum outputs 125, 135 is positive, the received packet is considered to have been decoded correctly, and the correctly decoded output is passed to functional circuitry 101 for further processing.

If only one of checksum outputs 125, 135 is positive, then the output of the baseband module 117 or 118 with the positive checksum output 125 or 135 is passed to functional circuitry 101 for further processing. If both of checksum outputs 125, 135 is positive, then the output of either of baseband modules 117, 118 can be passed to functional circuitry 101 for further processing, but normally coordination circuitry 116 picks a predetermined one of baseband modules 117, 118. If neither of checksum outputs 125, 135 is positive, the received packet is considered to have been decoded incorrectly, and a negative-acknowledgment/request-for-retransmission is issued via physical layer interfaces 107, 108 onto air interface 111.

As described above, configuration 200 provides increased transmission power. Because the same packet is sent from two physical layer interfaces 107, 108, the effective power is higher, resulting in increased range as well as resistance to interference from lower-power sources. Processing of the same packet by two different physical layer interfaces also gives configuration 200 increased signal diversity/reliability, because both interfaces have to fail for transmission or reception to fail.

Figure 3:
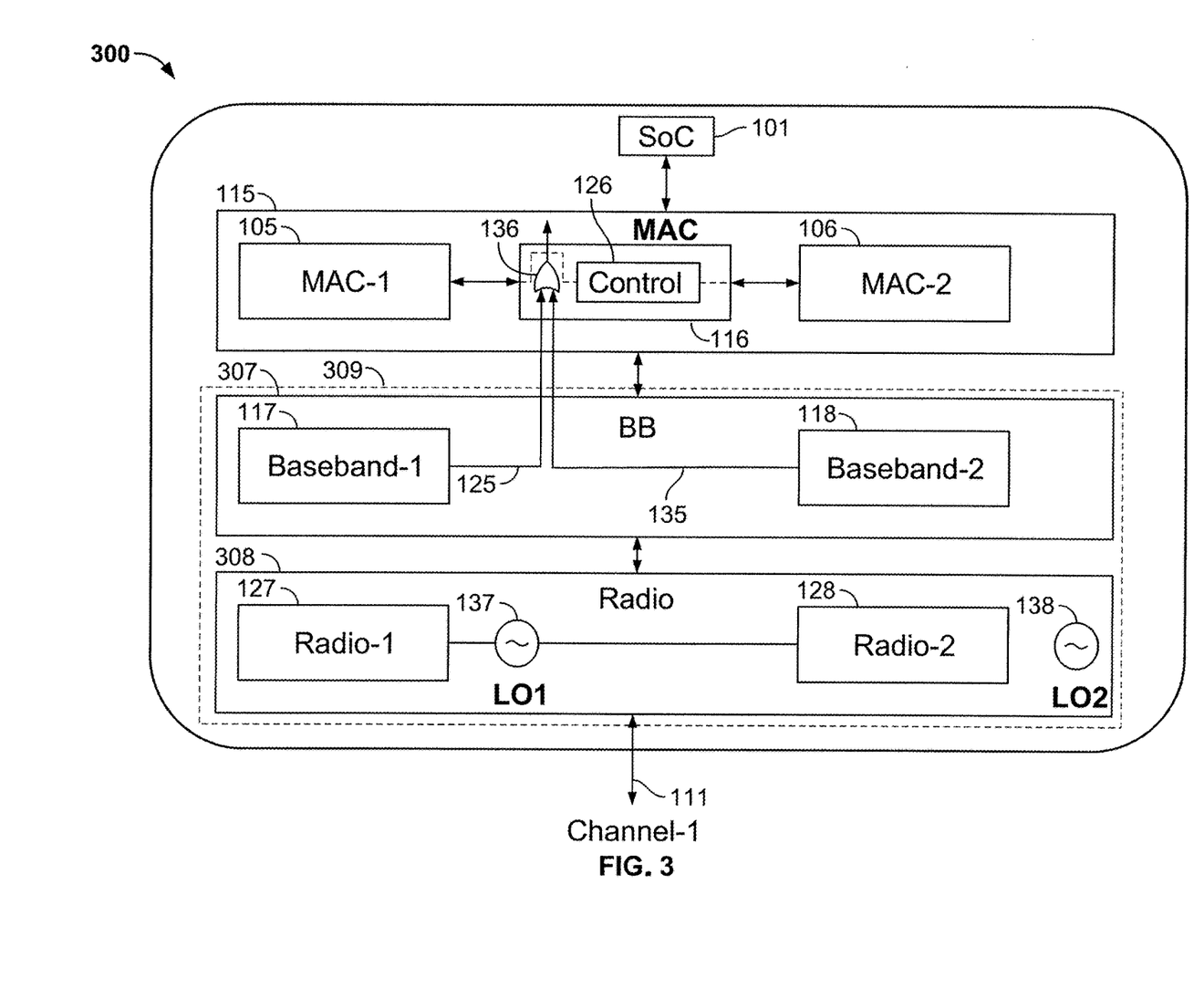
FIG. 3 is a representation of the device of FIGS. 1 and 2 in a third configuration according to implementations of the subject matter of this disclosure.

A third configuration 300 of device 100 is shown in FIG. 3. As in configuration 200, in configuration 300, both analog radio modules 127, 128 derive their frequencies from the same local oscillator 137. Alternatively (not shown), both local oscillators 137, 138 are tuned to the same frequency. A single MAC controls both baseband modules 117, 118. According to one variant (not shown), the single MAC is one of the two MACs 105, 106. According to the variant illustrated, the single MAC 115 is a combination of the two MACs 105, 106, linked by coordination circuitry 116.

Coordination circuitry 116 includes control circuitry 126 that allows MACs 105, 106 to coordinate commands to baseband modules 117, 118. In addition, in the variant illustrated, coordination circuitry 116 includes comparison circuitry 136 (in the illustration, the comparison circuitry is an OR-gate) which compares checksum outputs 125, 135 of MACs 105, 106 to determine whether a received packet has been decoded correctly by either one of baseband modules 117, 118. If either (or both) of checksum outputs 125, 135 is positive, the received packet is considered to have been decoded correctly, and is passed to functional circuitry 101 for further processing. If neither of checksum outputs 125, 135 is positive, the received packet is considered to have been decoded incorrectly, and a negative-acknowledgment/request-for-retransmission is issued via a combined physical layer interface including merged baseband module 307 and merged radio module 308 onto air interface 111.

Configuration 300 is similar to configuration 200 in having both radios tuned to the same frequency (either by sharing a local oscillator or having both oscillators tuned to the same frequency), and in having a shared or combined MAC. Configuration 300 differs from configuration 200 in that baseband modules 117, 118 are merged into a combined baseband module 307. As a result, combined baseband module 307 and combined radio module 308 replace the two physical layer interfaces 107, 108 of FIGS. 1 and 2 and together act as one physical interface 309 with a single larger MIMO radio. Thus, for example, if each physical layer interface 107, 108 is a 2×2 MIMO interface when operating alone (e.g., under dual-band concurrent operation), the combined physical layer interface 309 acts like a single 4×4 MIMO interface. More generally, if each respective one of the first and second baseband modules operates with a predetermined number of antennas and is configured to process a quantity of spatial streams equal to the predetermined number, then the combined first and second baseband modules operate as a merged baseband module with a merged number of antennas equal to twice the predetermined number.

The single or combined MAC 115 controls transmission and reception for the merged physical layer interface 308. In transmit mode, the 4×4 interface transmits up to four spatial streams. In receive mode, up to four spatial streams can be received. Diversity is increased as packets are transmitted or received by larger MIMO arrays (i.e., more antennas).

The merged baseband module 307 can operate according to at least two different options. Both options provide increased signal diversity, while one option also provides increased transmit power.

Implementation 400 of merged baseband module 307 (FIG. 4) supports a larger number of spatial streams. Transmission and reception are based on the merged MIMO array size, achieving higher throughput. For example, in a case of two 2×2 baseband modules (and accompanying analog radio modules) merged into a 4×4 MIMO system, the merged system jointly supports up to four spatial streams, compared to two spatial streams in each of the original 2×2 MIMO systems, providing increased throughput.

Figure 4:
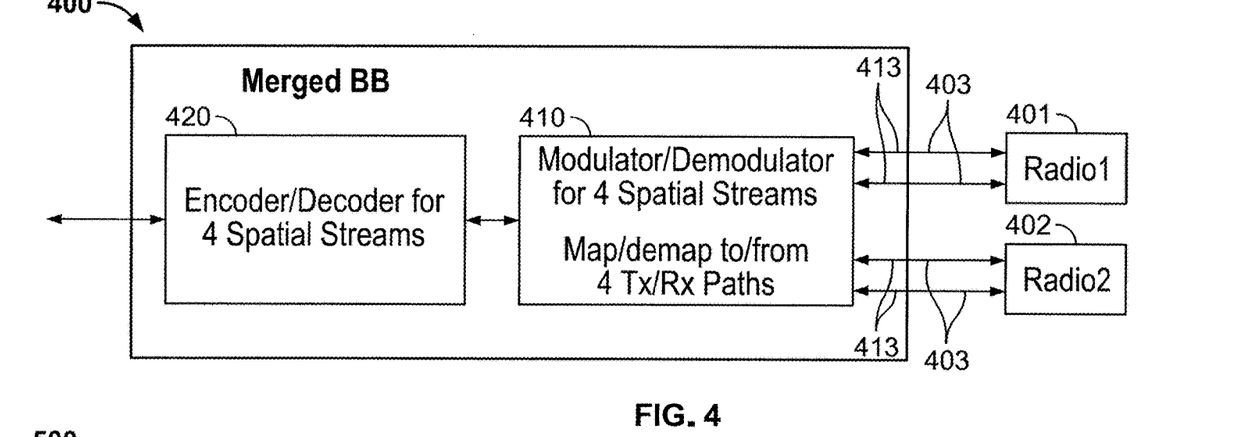
FIG. 4 is a representation of a first implementation of a merged baseband module according to the subject matter of this disclosure.

As shown in FIG. 4, merged baseband module 400 supports four transmission/reception paths 403—two paths each for each of analog radio modules 401, 402. Transmission/reception paths 403 map onto, or are mapped onto from, four spatial paths 413 in merged modulator/demodulator 410, increased from two spatial paths in the modulator/demodulator (not shown) of each of the unmerged baseband modules 117, 118. Modulator/demodulator 410 is coupled to merged encoder/decoder 420 which also supports four spatial paths, increased from two spatial paths in the encoder/decoder (not shown) of each of the unmerged baseband modules 117, 118. More generally, according to this option, if each unmerged module has a predetermined number of spatial streams, the merged module operates with a merged number of spatial streams equal to twice the predetermined number.

Implementation 500 of merged baseband module 307 (FIG. 5) supports the same number of spatial streams as the unmerged baseband modules 117, 118, but provides redundant data paths to improve both diversity and power, with the same throughput. For example, in a case of two 2×2 baseband modules (and accompanying analog radio modules) merged into a 4×4 MIMO system, the merged system transmits and receives two spatial streams as in the case of unmerged baseband modules 117, 118, but using the four data paths provided by four antennas to improve diversity and power.

Figure 5:
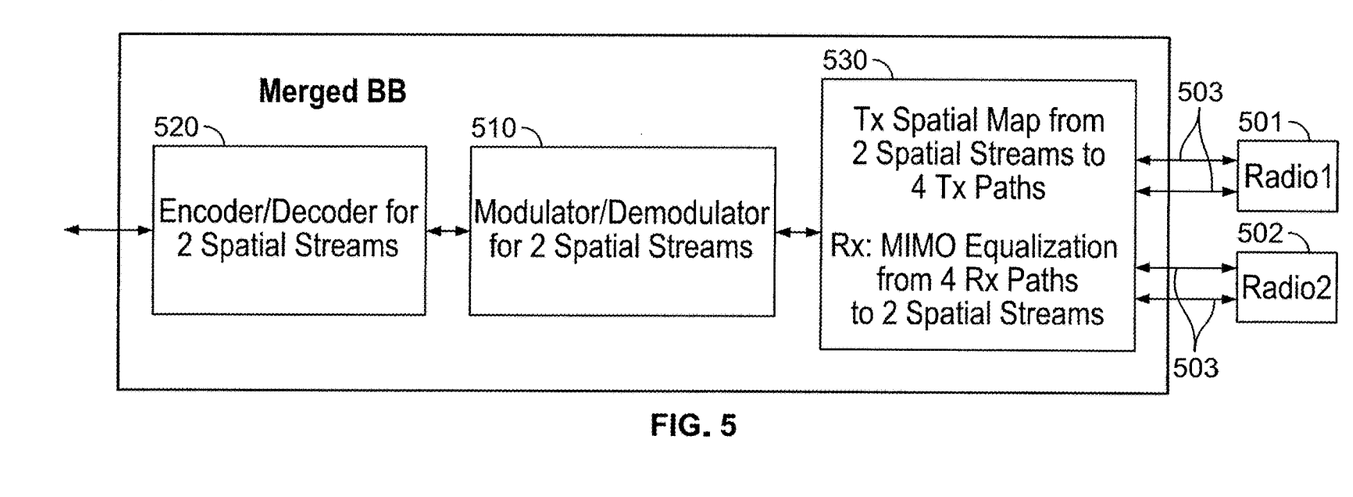
FIG. 5 is a representation of a second implementation of a merged baseband module according to the subject matter of this disclosure.

As shown in FIG. 5, merged baseband module 500 supports four transmission/reception paths 503—two paths each for each of analog radio modules 501, 502. Unlike merged baseband module 400, in merged baseband module 500, each of modulator/demodulator 510 and encoder/decoder 520 supports two spatial streams as in unmerged baseband modules 117, 118. However, merged baseband module 500 includes additional mapping/equalizer unit 530 to map the two spatial paths onto the four antennas in the transmit direction (with each spatial path transmitted on two different antenna paths for redundancy), and to carry out MIMO equalization from the four antennas (with redundancy) onto two spatial streams. More generally, according to this option, if each unmerged module has a predetermined number of spatial streams, the merged module operates with a predetermined number of spatial streams, with redundant paths for each spatial stream.

Methods in accordance with implementations of the subject matter of this disclosure are illustrated in FIGS. 6-9.

Figure 6:
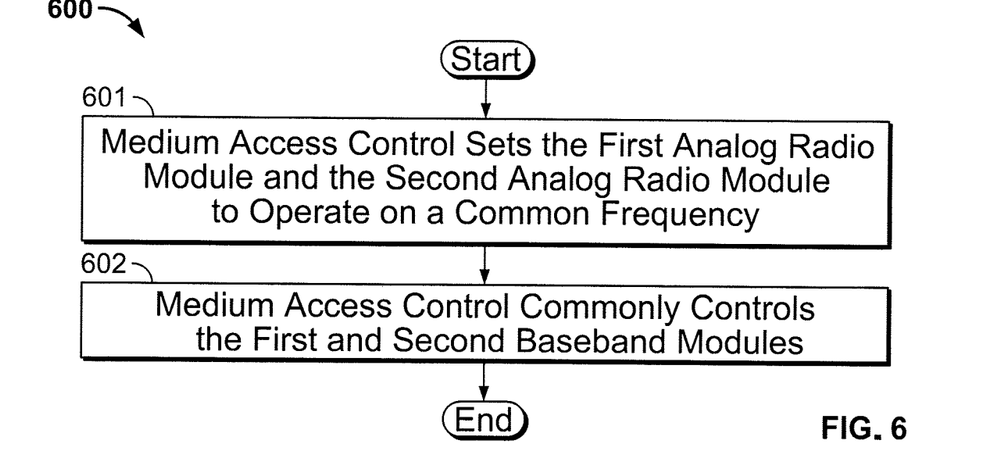
FIG. 6 is a flow diagram of a method according to implementations of the subject matter of this disclosure.
Figure 7:
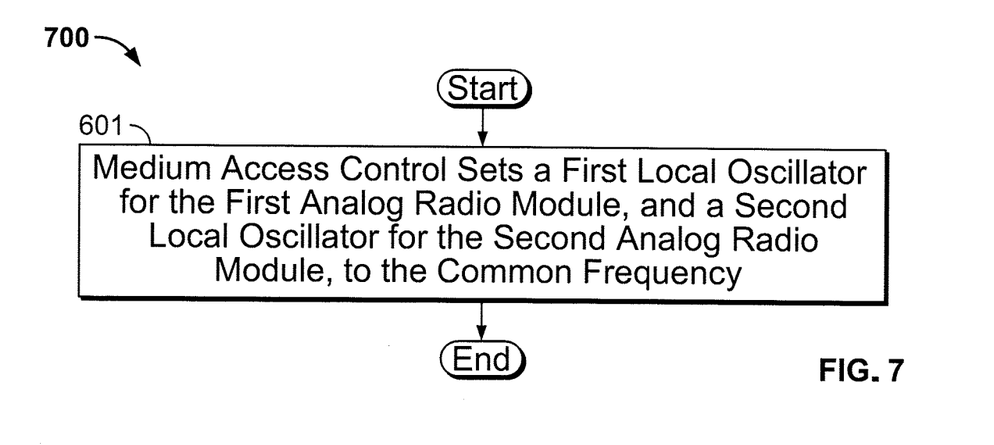
FIG. 7 is a flow diagram of a first implementation of a portion of the method represented in FIG. 6.
Figure 8:
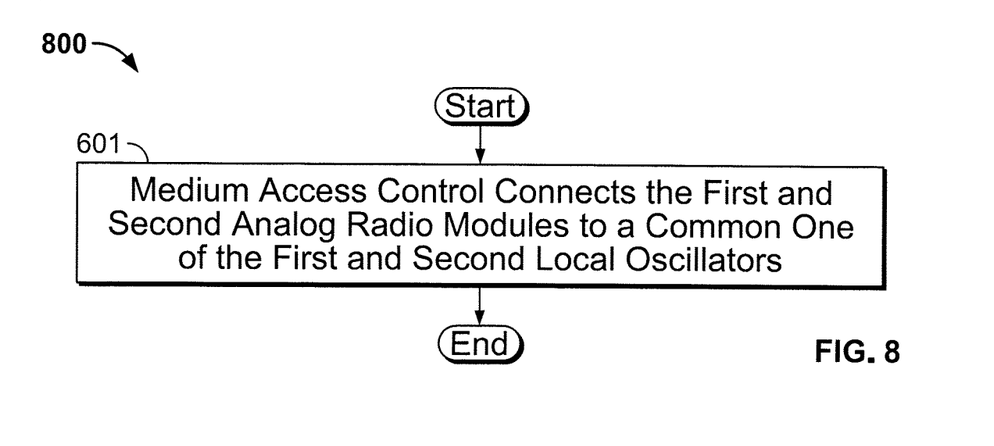
FIG. 8 is a flow diagram of a second implementation of a portion of the method represented in FIG. 6.

As seen in FIG. 6, in method 600 according to implementations of the subject matter of this disclosure, at 601 the medium access control sets the first analog radio module and the second analog radio module to operate on a common frequency. According to one alternative 700 shown in FIG. 7, the medium access control sets the first analog radio module and the second analog radio module to operate on a common frequency by setting a first local oscillator for the first analog radio module, and a second local oscillator for the second analog radio module, to the common frequency. According to another alternative 800 shown in FIG. 8, the medium access control sets the first analog radio module and the second analog radio module to operate on a common frequency by connecting both analog radio modules to a common one of the first and second local oscillators. Returning to FIG. 6, after the medium access control sets the first analog radio module and the second analog radio module to operate on a common frequency at 601, at 602 the medium access control commonly controls both baseband modules, and method 600 ends.

Figure 9:
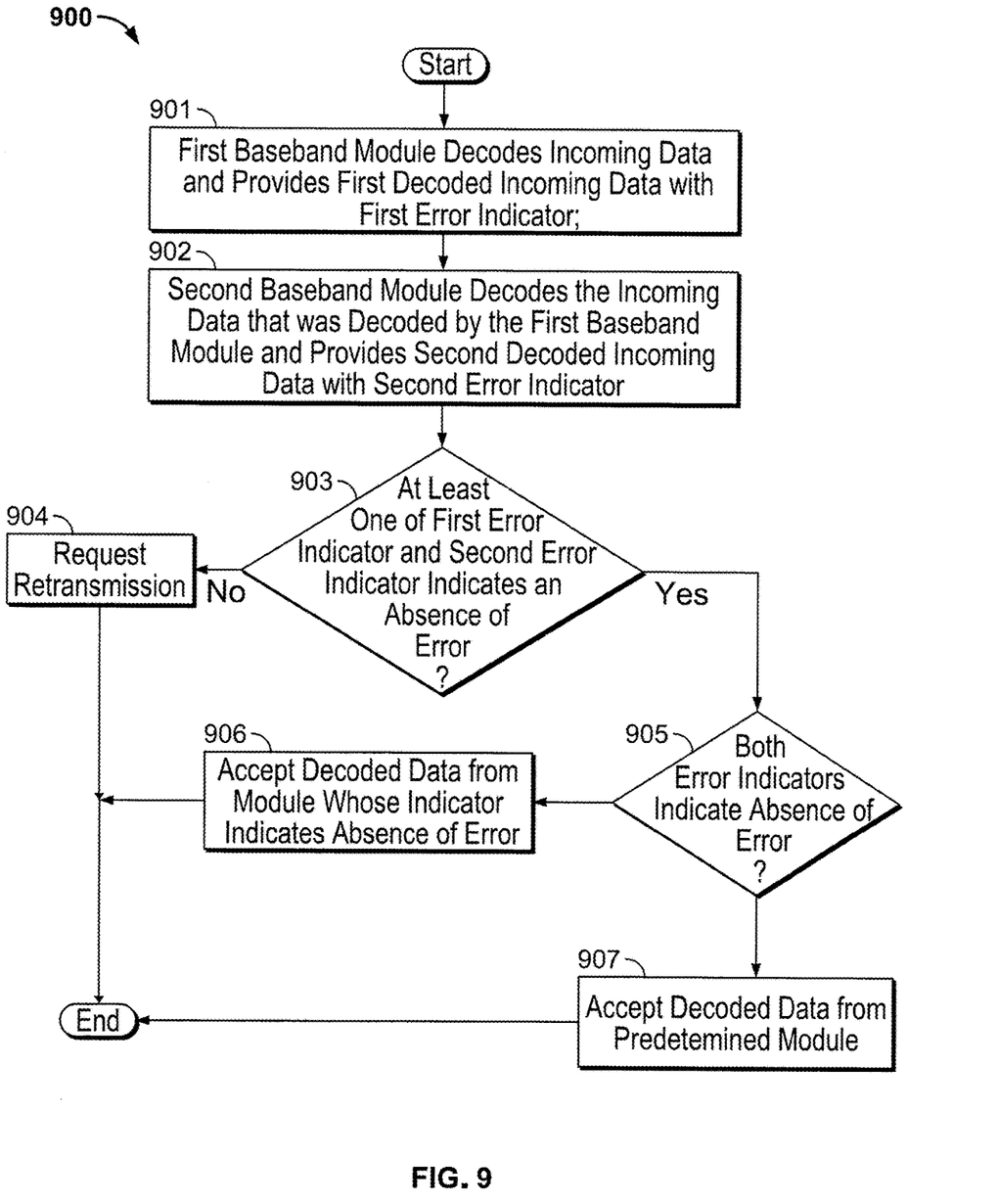
FIG. 9 is a flow diagram of an implementation of another portion of a method according to the subject matter of this disclosure.

FIG. 9 illustrates a method 900 according to implementations of this disclosure for coordination of two baseband modules by a single or combined medium access controller. At 901, the first baseband module decodes incoming data and provides first decoded incoming data with a first error indicator. At 902, the second baseband module decodes incoming data and provides second decoded incoming data with a second error indicator. At 903, it is determined whether at least one of first error indicator and second error indicator indicates an absence of error. If not—i.e., if neither error indicator indicates absence of error—then at 904, retransmission is requested and method 900 ends.

If at 903, it is determined that at least one of first error indicator and second error indicator indicates an absence of error, then at 905 it is determined whether both error indicators indicate the absence of error. If not—i.e., if only one of the error indicators indicates the absence of error—then at 906 the decoded data is accepted from the one module whose error indicator indicated the absence of error, and method 900 ends. If at 905 it is determined that both error indicators indicate the absence of error, then at 907 data is accepted from a predetermined one of the modules (i.e., from one of the modules designated in advance to be used when there is no error on either module), and method 900 ends.

Thus it is seen that a flexible, reconfigurable channel architecture, for selectably operating a dual-radio device as two separate channels, or as a single enhanced channel, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A wireless device comprising:
a first analog radio module;
a first medium access control module configured to control access to a digital network via the first analog radio module;
a first baseband module configured to convert between analog signals at the first analog radio module and digital signals at the first medium access control module;
a second analog radio module;
a second medium access control module configured to control access to a digital network via the second analog radio module;
a second baseband module configured to convert between analog signals at the second analog radio module and digital signals at the second medium access control module; and
circuitry configured to selectably coordinate the first and second medium access control modules to create a single-channel configuration for utilization by the wireless device to transmit and receive radio signals over a wireless interface, by setting the first analog radio module and the second analog radio module to operate on a common frequency, and by commonly controlling the first and second baseband modules to convert common packets between analog and digital signals transmitted to or received from respective medium access control modules.

2. The wireless device of claim 1, wherein the circuitry configured to selectably coordinate the first and second medium access control modules is further configured to selectably operate the first and second medium access control modules, the first and second analog radio modules and the first and second baseband modules in a dual-band concurrent mode.

3. The wireless device of claim 1, further comprising:
a first local oscillator configured to provide a frequency source for the first analog radio module; and
a second local oscillator configured to provide a frequency source for the second analog radio module; wherein:
the circuitry configured to selectably coordinate is configured to set the first and second analog radio modules to operate on the common frequency by setting the first and second local oscillators to the common frequency.

4. The wireless device of claim 1, further comprising:
a first local oscillator configured to provide a frequency source for the first analog radio module; and
a second local oscillator configured to provide a frequency source for the second analog radio module; wherein:
the circuitry configured to selectably coordinate is configured to set the first and second analog radio modules to operate on a common frequency by connecting the first and second analog radio modules to a common one of the first and second local oscillators.

5. The wireless device of claim 1, wherein the circuitry configured to selectably coordinate is configured to configure the first and second medium access control modules for common control of the first and second baseband modules by interconnecting the first and second medium access control modules as a single combined media access control module that transmits identical packets to, and receives identical packets from, both the first and second baseband modules.

6. The wireless device of claim 1, wherein the circuitry for selectively coordinating is configured to configure the first and second medium access control modules for common control of the first and second baseband modules by disconnecting one of the first and second baseband modules from its respective one of the first and second medium access control modules, and connecting the one of the first and second baseband modules to another of the first and second medium access control modules.

7. The wireless device of claim 1, wherein:
the first baseband module is configured to decode incoming data, and to provide first decoded incoming data with a first error indicator;
the second baseband module is configured to decode the incoming data that is decoded by the first baseband module, and to provide second decoded incoming data with a second error indicator; and
the coordinated first and second medium access control modules comprise circuitry configured to compare the first error indicator and the second error indicator, and to accept one of the first decoded incoming data and the second decoded incoming data from one of the first baseband module and the second base band module when at least one of the first error indicator and the second error indicator indicates an absence of error.

8. The wireless device of claim 7, wherein each respective one of the first error indicator and the second error indicator is a respective checksum.

9. The wireless device of claim 1, wherein:
each respective one of the first and second baseband modules has a predetermined number of antennas and is configured to process a quantity of spatial streams equal to the predetermined number; and
the circuitry configured to selectably coordinate coordinates the first and second baseband modules to operate as a merged baseband module having a merged number of antennas equal to twice the predetermined number.

10. The wireless device of claim 9, wherein the merged baseband module is configured to process a merged number of spatial streams equal to twice the predetermined number.

11. The wireless device of claim 9, wherein the merged baseband module is configured to process each of the spatial streams on more than one of the antennas to provide redundant data paths for each of the spatial streams.

12. A method of operating a wireless device having a first analog radio module, a first medium access control module configured to control access to a digital network via the first analog radio module, a first baseband module configured to convert between analog signals at the first analog radio module and digital signals at the first medium access control module, a second analog radio module, a second medium access control module configured to control access to a digital network via the second analog radio module, a second baseband module configured to convert between analog signals at the second analog radio module and digital signals at the second medium access control module; the method comprising:
selectably coordinating the first and second medium access control modules to create a single-channel configuration for utilization by the wireless device to transmit and receive radio signals over a wireless interface, by setting the first analog radio module and the second analog radio module to operate on a common frequency, and by commonly controlling the first and second baseband modules to convert common packets between analog and digital signals transmitted to or received from respective medium access control modules.

13. The method of claim 12, further comprising selectably operating the first and second medium access control modules, the first and second analog radio modules and the first and second baseband modules in a dual-band concurrent mode.

14. The method of claim 12, wherein the selectably coordinating comprises:
setting a first local oscillator, configured to provide a frequency source for the first analog radio module, and a second local oscillator, configured to provide a frequency source for the second analog radio module, to the common frequency.

15. The method of claim 12, wherein, when a first local oscillator provides a frequency source for the first analog radio module and a second local oscillator provides a frequency source for the second analog radio module, the selectably coordinating comprises setting the first and second analog radio modules to operate on a common frequency by connecting the first and second analog radio modules to a common one of the first and second local oscillators.

16. The method of claim 12, wherein the selectably coordinating the first and second medium access control modules for common control of the first and second baseband modules comprises interconnecting the first and second medium access control modules as a single combined medium access control module that transmits identical packets to, and receives identical packets from, both the first and second baseband modules.

17. The method of claim 12, wherein the selectably coordinating the first and second medium access control modules for common control of the first and second baseband modules comprises disconnecting one of the first and second baseband modules from its respective one of the first and second medium access control modules, and connecting the one of the first and second baseband modules to another of the first and second medium access control modules.

18. The method of claim 12, wherein the coordinating the first and second medium access control modules to create the single-channel configuration by commonly controlling the first and second baseband modules comprises:
configuring the first baseband module to decode incoming data and provide first decoded incoming data with a first error indicator;
configuring the second baseband module to decode the incoming data that is decoded by the first baseband module and provide second decoded incoming data with a second error indicator; and
configuring the first and second medium access control modules to compare the first error indicator and the second error indicator, and to accept one of the first decoded incoming data and the second decoded incoming data from one of the first baseband module and the second baseband module when at least one of the first error indicator and the second error indicator indicates an absence of error.

19. The method of claim 18, wherein:
configuring the first baseband module to provide a first error indicator comprises configuring the first baseband module to provide a first checksum; and
configuring the second baseband module to provide a second error indicator comprises configuring the second baseband module to provide a second checksum.

20. The method of claim 12, wherein, when each of the first and second medium access control modules has a predetermined number of antennas and is configured to process a quantity of spatial streams equal to the predetermined number, the selectably coordinating the first and second medium access control modules to create the single-channel configuration by commonly controlling the first and second baseband modules comprises controlling the first and second baseband modules to process a merged number of spatial streams equal to twice the predetermined number.

21. The method of claim 12, wherein, when each of the first and second medium access control modules has a predetermined number of antennas and is configured to process a predetermined number of spatial streams, the selectably coordinating the first and second medium access control modules to create the single-channel configuration by commonly controlling the first and second baseband modules comprises controlling the first and second baseband modules to process each of the spatial streams on more than one of the antennas to provide redundant data paths for each of the spatial streams.

* * * * *